(12) United States Patent
Mayet

(10) Patent No.: US 6,887,327 B2
(45) Date of Patent: May 3, 2005

(54) OSCILLATING-ARM APPARATUS FOR PRODUCING A TIRE REINFORCEMENT FROM A SINGLE THREAD

(75) Inventor: Jean-Claude Mayet, Clermont-Ferrand (FR)

(73) Assignee: Michelin Recherche et Technique S.A., Granges-Pacot (CH)

( * ) Notice: Subject to any disclaimer, the term of this patent is extended or adjusted under 35 U.S.C. 154(b) by 127 days.

(21) Appl. No.: 10/067,395

(22) Filed: Feb. 5, 2002

(65) Prior Publication Data

US 2002/0117265 A1 Aug. 29, 2002

(30) Foreign Application Priority Data

Feb. 7, 2001 (FR) .............................................. 01 01748

(51) Int. Cl.[7] .............................................. B29D 30/16
(52) U.S. Cl. ...................... 156/117; 156/135; 156/397; 156/398
(58) Field of Search ................................ 156/117, 397, 156/123, 133, 121, 130.7, 135, 398, 405.1, 173, 175; 901/15

(56) References Cited

U.S. PATENT DOCUMENTS

| | | | | |
|---|---|---|---|---|
| 5,159,249 A | * | 10/1992 | Megherbi | ................. 318/568.1 |
| 5,616,209 A | | 4/1997 | Laurent et al. | |
| 6,328,836 B1 | * | 12/2001 | Ogawa | ........................ 156/117 |
| 6,463,978 B2 | | 10/2002 | Mayet | |
| 6,623,582 B1 | * | 9/2003 | Ogawa | ........................ 156/117 |

FOREIGN PATENT DOCUMENTS

| | | |
|---|---|---|
| EP | 0962304 A2 | 12/1999 |
| EP | 1122055 A1 | 8/2001 |
| GB | 179312 | 5/1922 |

* cited by examiner

Primary Examiner—Geoffrey L. Knable
(74) Attorney, Agent, or Firm—Cohen, Pontani, Lieberman & Pavane

(57) ABSTRACT

The thread 4, intended to form a carcass reinforcement, is laid in continguous hoops on a rigid core 1 by a system with at least two oscillating arms transporting an orifice 6 so as to enable it to pass over a core 1 and thus lay adjacent hoops.

23 Claims, 12 Drawing Sheets

US 6,887,327 B2

OSCILLATING-ARM APPARATUS FOR PRODUCING A TIRE REINFORCEMENT FROM A SINGLE THREAD

TECHNICAL FIELD OF THE INVENTION

The present invention relates to the production of tires. More particularly, it concerns the putting into place of threads to form a tire reinforcement and proposes means capable of producing such a reinforcement on a form close or identical to the form of the inner cavity of the tire, that is to say, a substantially toroidal form, supporting the blank of a tire during its production.

BACKGROUND OF THE INVENTION

In this technical field, methods and apparatuses which enable the integration of the production of the tire reinforcements in the assembly of the tire itself are already known. This means that, rather than resorting to semi-finished products, such as reinforcement plies, one or more reinforcements are constructed in situ at the time when the tire is produced and from a single thread reel. Among these methods and apparatuses, the solution described in U.S. Pat. No. 5,616,209 is very particularly suitable for the construction of carcass reinforcements on a rigid core, the outer surface of which corresponds substantially to the form of the inner cavity of the final tire. The '209 patent discloses an apparatus in which the thread intended to form a carcass reinforcement is laid in contiguous hoops on a rigid core by an eyelet fixed on a chain mounted on pulleys so as to surround the core by forming a kind of "C" shape. The eyelet performs a to-and-fro movement about the core so as to lay, progressively and contiguously, one hoop on each outward journey and one hoop on each return journey, with the intervention of appropriate pressers for applying the ends of the hoops to the rigid core, precoated with crude rubber, in the process.

An apparatus likewise provided for the construction of carcass reinforcements on a rigid core, the outer surface of which corresponds substantially to the form of the inner cavity of the final tire, is known from the European Patent Application EP 0 962 304. This document discloses, in a first embodiment, a single oscillating arm, the end of which, supporting a guiding member comparable to the eyelet mentioned above, necessarily describes circular arcs. Reference may be made to FIG. 3 of the Patent Application EP 0 962 304. The problem which arises is that if it is desired to operate at rapid laying rates, it is advisable that the extent of the characteristic angles and radii of the circular arc described is not too large. It is also advisable that the ends of the circular arc are not too far away from the bead, that is to say, the effective thread laying zone. Otherwise, the result would be harder work for the presser members and/or greater imprecision of the thread laying. If the geometrical axis of rotation of the oscillating arm is moved away towards the largest radii, the arm can skirt round the core without striking it. This promotes laying precision, but the circular arc described then becomes much larger (both in terms of angle and radius) and it is more difficult to operate at high rates. In summary, the important operating parameters are the position of the center of rotation of the oscillating arm, the swept angle, the radius of the arm, and the clearance which the arm must have with respect to the form over its entire length and in every operational spatial position.

In a second embodiment of the Patent Application EP 0 962 304, there can be seen a system with a cam and multiple articulated oscillating arms, the end supporting a guiding member which is comparable to the eyelet mentioned above, and which this time is held permanently in contact with the core. Reference may be made to FIG. 5 of the Patent Application EP 0 962 304. The problem which arises is that such a device exhibits a lot of friction, and that it might cause disruption, especially in the products made of crude rubber already laid on the surface of the core, which would be all the more extensive since one would be seeking to operate at high rates.

The object of the present invention is to propose apparatuses capable of operating according to the general method described in the above-mentioned U.S. Pat. No. 5,616,209, and capable of operating at considerable rates without having a detrimental effect on the operating precision.

SUMMARY OF THE INVENTION

In accordance with the invention, an apparatus is provided for producing a tire reinforcement formed from a thread delivered substantially continuously and on request by an appropriate dispenser, said apparatus being intended to be used in cooperation with a substantially toroidal form on which the reinforcement is progressively constructed by laying hoops of the thread on a desired path for the thread on the surface of the form, the apparatus being intended to be used in cooperation with pressers close to each end of the thread path for applying the thread to the form at the ends, the apparatus including:

a guiding member in which the thread can slide freely;

at least one arm oscillating about a geometrical axis of rotation, the oscillating arm comprising a head remote from its geometrical axis of rotation;

control means for imparting to the oscillating arm an oscillatory movement about its geometrical axis of rotation, the apparatus being arranged so that the head of the arm transports the guiding member directly, or indirectly via one or more other oscillating arms;

wherein the distance between the head of the at least one arm and the geometrical axis of rotation of the arm is variable.

Reference is made to the above-mentioned U.S. Pat. No. 5,616,209, the subject matter of which is hereby incorporated by reference, as the present invention adopts not only the method which is described therein, but also to a large extent the pressers which intervene to enable the formation of a loop and to apply the loop against the core. As a reminder, the pressers each comprise essentially a fork and a hammer. Apart from a few details, the exemplary embodiment of the pressers which is described therein could be adopted as it is, even though a new form for the pressers is proposed below.

The main differences introduced by the invention concern the driving of the guiding member in which the thread can slide freely (namely the eyelet). In other words, the oscillating-arm systems described below are designed to be able to take the place of the chain system described in the above-mentioned U.S. Pat. No. 5,616,209.

Before giving a detailed description of the novel means for driving the thread guiding member, a few points are discussed which will help to provide a better understanding of the invention.

First of all, it should be noted that, as in the cited patent, the term "thread" is of course to be understood in a very general sense, encompassing a monofilament, a multifilament, an assembly such as, for example, a cord or a plied yarn, or a small number of grouped cords or plied yarns, and this whatever the nature of the material, and whether or not the "thread" is precoated with rubber. In the present specification, the term "hoop" is employed to designate a length of thread extending from one singular point to another in the reinforcement armature. The whole set of the hoops arranged over the entire circumference of the tire forms the actual reinforcement. A hoop in the sense defined here may form part of a carcass, or of a crown reinforcement, or of any other type of reinforcement. The hoops may be separated by cutting the thread in the course of laying, or all may be interconnected in the final reinforcement, for example by loops.

Basically, the invention deals with the continuous laying of a reinforcement thread in a configuration as close as possible to the configuration in the final product. With the thread being delivered on request by an appropriate dispenser, comprising, for example, a thread reel and where appropriate a device for controlling the tension of the thread withdrawn from the reel, the apparatus for producing a reinforcement from a single thread cooperates with a form (rigid core or a membrane) on which the tire is produced. It is unimportant that the reinforcement is, for completeness, produced in a plurality of successive rotations of the form, with cutting of the thread or not between two rotations.

When positions, directions or senses are defined with the words "radially, axially, circumferentially", or when radii are referred to, the core on which the tire is produced, or the tire by itself, is taken as the point of reference. The geometrical reference axis is the axis of rotation of the form.

Furthermore, as already indicated in the above-mentioned U.S. Pat. No. 5,616,209, the thread laying members described here also enable the construction of a reinforcement, for example a carcass reinforcement, in which the thread laying pitch is variable. The term "laying pitch" is understood to mean the distance resulting from the sum of the spacing between two adjacent threads and the diameter of the thread. It is well known that for a carcass reinforcement, the spacing between threads varies according to the radius at which it is measured. It is not a question here of this variation, but rather of a variable pitch at a given radius. For this, it is sufficient to vary the rotational speed of the form according to any appropriate law, without changing the work rate of the guiding member. This gives a tire in which the carcass reinforcement threads, for example for a radial carcass, are arranged with a pitch having a controlled variation for a given radial position.

Various embodiments of the invention may be envisaged. It will be seen that, in each embodiment, the apparatus causes the thread guiding member to describe a movement substantially contained in one plane—the movement plane—perpendicular to the geometrical axis of rotation of a first oscillating arm, the movement plane being remote from the oscillating arm and, more precisely, from the shaft about which it rotates. The apparatus comprises means for controlling the first oscillating arm, which are arranged to impart to the oscillating arm an oscillatory movement about its geometrical axis of rotation. The apparatus is arranged so that the head of the arm transports the guiding member in a cyclical movement described in a movement plane, in order to bring the guiding member in successive cycles into the vicinity of each of the desired ends for the thread in the thread path.

Hereinbelow, in two embodiments, a description is given of arrangements in which the apparatus comprises a second arm oscillating about a geometrical axis of rotation, the said geometrical axes of rotation of the first and second oscillating arms being substantially parallel. The second arm comprises a head transporting the guiding member directly, or indirectly via one or more other arms, with the head of the first arm supporting the geometrical axis of rotation of the second arm. Advantageously, the head of the second arm is radially remote from the geometrical axis of rotation of the second arm. It should be noted furthermore that, in these embodiments, the apparatus preferably comprises means for controlling the relative position of the second arm with respect to the first arm, so that the guiding member is transported in a cyclical movement described in the movement plane in order to bring the guiding member in successive cycles into the vicinity of each of the desired ends for the thread in the thread path.

In a more particular and non-limiting manner, the aforementioned two embodiments include the following features:
the head of the second arm is curved towards the form and directly supports the guiding member, so as to bring the guiding member close to the form at least in the configuration assumed by the apparatus when the guiding member is close to the end of the path; and
the first arm is substantially oriented perpendicular to its geometrical axis of rotation, and the second arm has at least one intermediate part oriented substantially parallel to the geometrical axis of rotation of the first arm.

These constructional arrangements prove to be advantageous in positioning the thread guiding member correctly above the form, especially at the ends of the laying path, without any part of the arms striking the form during the to-and-fro movement.

In addition, a description is also given hereinbelow of an embodiment with a single sliding arm, used to produce a tire for the PAX system, of which it is known that the bead has a very specific form making it unnecessary for the head of the last arm, that carrying the guiding member, to be curved towards the form. Of course, this embodiment may also be used for producing conventional tires, and thus in particular with an arm curved towards the form, and vice versa, this being said once for all.

BRIEF DESCRIPTION OF THE DRAWINGS

For a better understanding of the invention, reference may be made to the following description of exemplary embodiments thereof, taken in conjunction with the accompanying drawings, in which.

DETAILED DESCRIPTION OF EXEMPLARY EMBODIMENTS OF THE INVENTION

Figure 1:
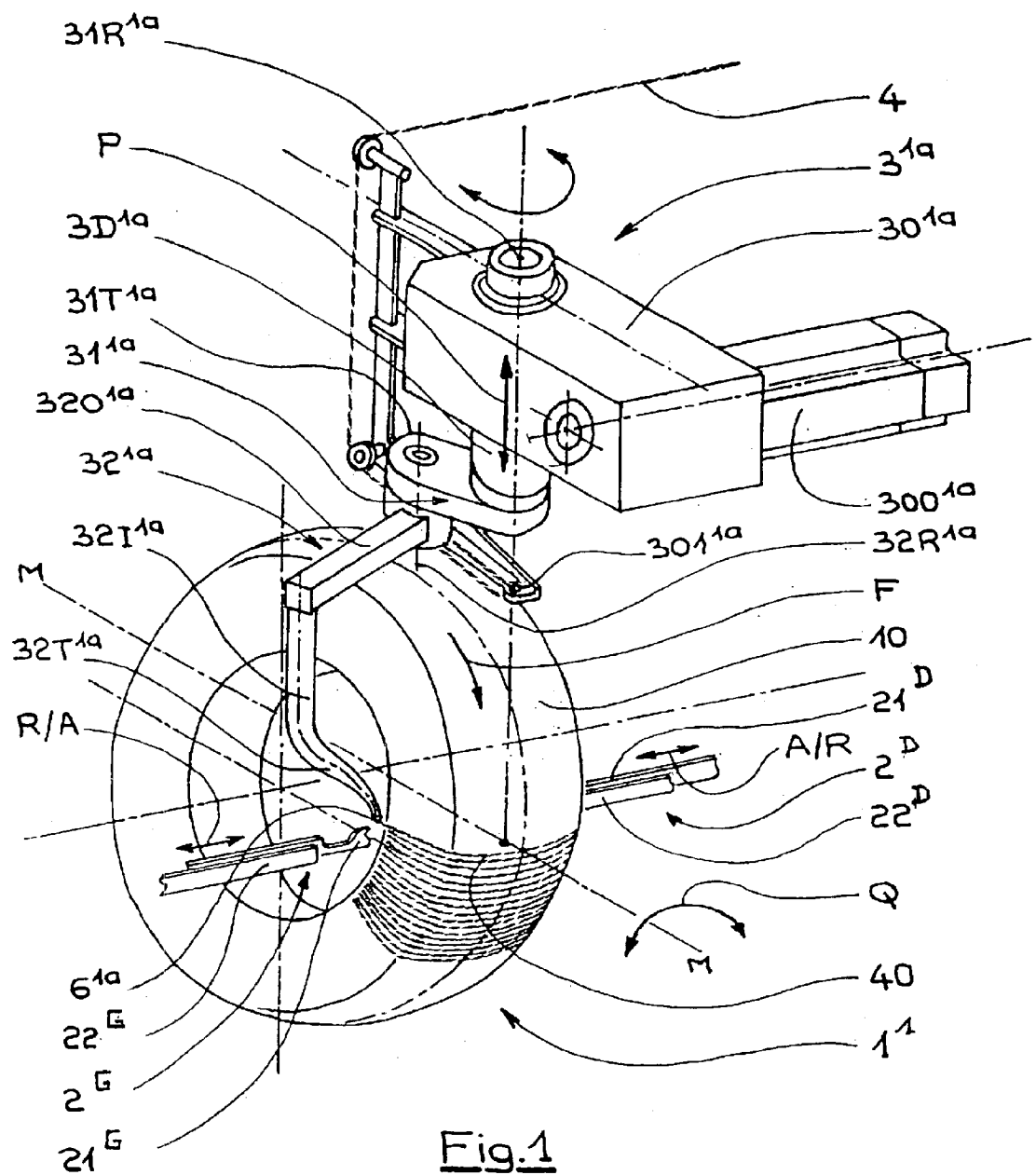
FIG. 1 is a perspective of a first version of the first embodiment of an apparatus according to the invention.

In FIG. 1 (and also for all the examples described, but without being limiting), it can be seen that the form is a (rigid and demountable) core $1^1$ defining the geometry of the inner surface of the tire. The core is coated with rubber 10, for example with a layer of impermeable rubber based on butyl rubber, and with a layer of rubber for coating the carcass threads. The rubber 10 covering the core 1 enables the retention of the hoops 40 of thread 4 on the core 1 as the thread is being laid, owing to a bonding effect. The core 1 is, of course, rotationally driven by any suitable device (not shown).

The actual laying members comprise essentially an oscillating-arm system $3^{1a}$, on the one hand, and presser devices $2^G$ and $2^D$, on the other hand. The oscillating-arm system $3^{1a}$ is mounted on an oscillating shaft $3D^{1a}$ the geometrical axis of rotation $31R^{1a}$ of which can be seen. In the operational position for laying the thread 4 on the core, the geometrical axis of rotation $31R^{1a}$ intersects the core 1. A housing $30^{1a}$ comprises a mechanical control device suitable for converting the rotary movement of a motor $300^{1a}$ into oscillatory movement imparted to the shaft $3D^{1a}$. The oscillating-arm system 3 comprises a first oscillating arm $31^{1a}$ and a second oscillating arm $32^{1a}$, arranged in succession. This arrangement with two oscillating arms enables easy displacement of the guiding member (described below) from one bead to the other, and thus makes it possible to obtain an action of the apparatus, in conjunction with the presser devices $2^G$ and $2^D$, from one bead to the other.

With regard to the references in the figures, the convention used is to designate similar members by the same main reference, for example "3" for the oscillating-arm system, and to indicate the fact that something belongs specifically to an embodiment or version with an alphanumeric index placed as a superscript, for example "$^{1a}$" for the embodiment "1" (first embodiment) (using a succession of three oscillating arms), in the version "a". A reference without a specific indication refers to a member which is always the same in the different versions or is to be understood as designating all the versions of all the embodiments alike.

Analogously, with regard to the core 1, the convention used is to designate a particular kind of form by an alphanumeric index placed as a superscript, for example "$1^1$". A reference without a specific indication refers to any kind of form without distinction, which is the general case of the description, and contrary to the drawings, for which a choice has been made for illustration.

The first arm $31^{1a}$ is mounted on the oscillating shaft $3D^{1a}$. The first arm $31^{1a}$ comprises a head $31T^{1a}$ at the end opposite the geometrical axis of rotation $31R^{1a}$. The second arm $32^{1a}$, articulated by a geometrical axis of rotation $32R^{1a}$ of the second arm, is mounted on the head $31T^{1a}$ of the first arm $31^{1a}$. The second arm $32^{1a}$ comprises a base $320^{1a}$ oriented substantially perpendicular to the geometrical axis of rotation $32R^{1a}$. Next, the second arm $32^{1a}$ comprises an intermediate part $321^{1a}$ extending substantially parallel to the geometrical axis of rotation $32R^{1a}$, in the direction of the movement plane. Finally, the second arm $32^{1a}$ comprises a head $32T^{1a}$, at the end of which is an orifice $6^{1a}$.

A very advantageous feature of this first example (which is also found in all the other examples described here, without this being limiting) concerns the guidance of the thread 4. First of all, the thread 4 is brought to an eyelet $301^{1a}$, fixed in space, situated substantially on the geometrical axis of rotation $31R^{1a}$ of the first arm. Next, the thread enters an orifice (not shown) formed at the base of the second arm $32^{1a}$ and makes its way along inside the said second arm, which is hollow. Finally, at the end of the head of the second arm, the guiding member consists of an orifice $6^{1a}$ at the end of the second oscillating arm $32^{1a}$. This orifice fulfils the function fulfilled by the eyelet "33" in the above-mentioned U.S. Pat. No. 5,616,209. All the examples described relate to very particularly advantageous embodiments comprising only two oscillating arms. Consequently, the head of the second oscillating arm transports the guiding member directly.

Figure 2:
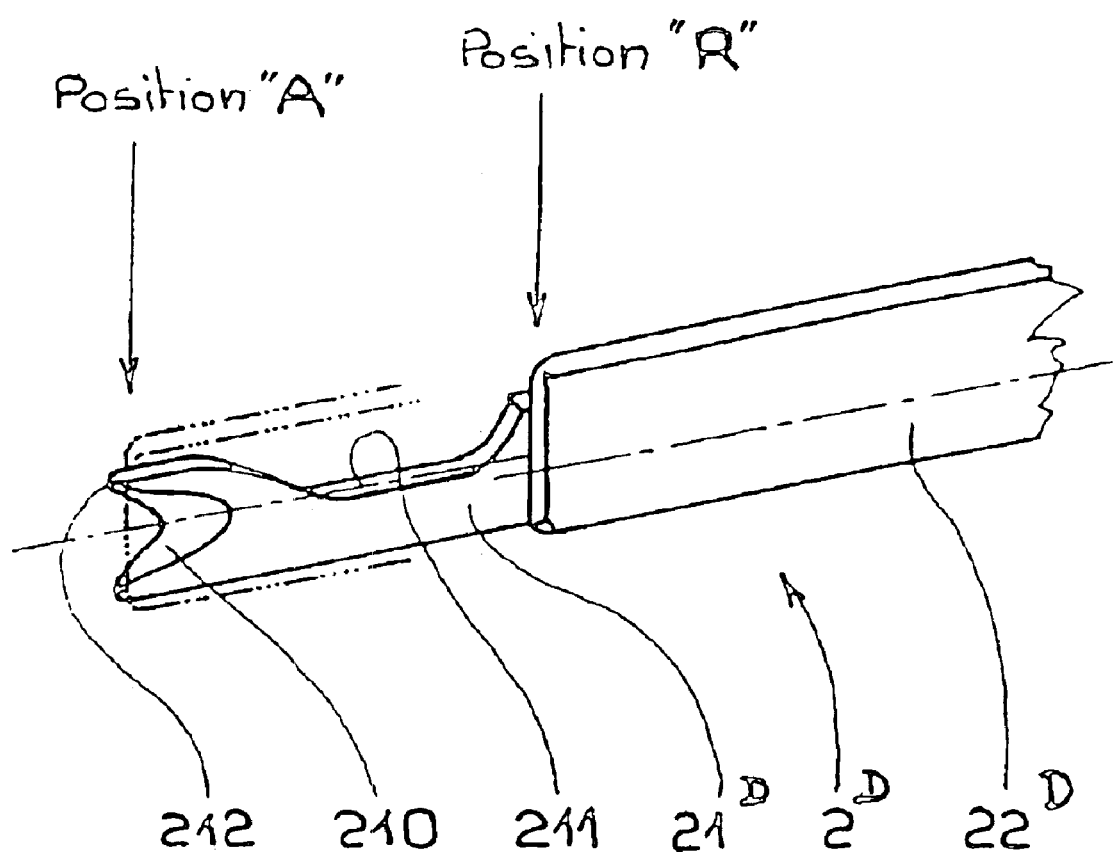
FIG. 2 is a detail view of a presser of the apparatus of FIG. 1.

Before dealing with the control of all the movements of the oscillating-arm system $3^{1a}$ in detail, reference is again made to the presser devices $2^G$ and $2^D$. They must be positioned in a manner which is suitable for performing the function described in the above-mentioned U.S. Pat. No. 5,616,209. In FIG. 2, there can be seen more particularly the presser $2^D$ which comprises a fork $21^D$ and a hammer $22^D$, both being movable between a retracted position, at R (position remote from the core 1), and an advanced position, at A. The hammer in the advanced position can be seen in broken lines. With regard to the references in the figures, the convention used is to designate each of the members of the pressers by a main reference, for example "21" for the fork, and to indicate the fact that something belongs specifically to the presser on one side, the left-hand side or the right-hand side in FIG. 1, respectively with the letter "$^G$" or "$^D$" placed as a superscript. A reference without a specific indication refers in a general way without distinction to either of the pressers or to their members.

Reference is once again made to the relevant part of the description of the above-mentioned U.S. Pat. No. 5,616,209, for a description of the respective functions of the fork 21 and of the hammer 22 and of the respective roles of the positions referred to as advanced A and retracted R. In FIG. 2, it can be seen that both the fork 21 and the hammer 22 have the appearance of parallel strips. The fork 21 is, with respect to the hammer, always arranged radially on the side of the axis of rotation of the core 1. It should be pointed out, however, that an exactly opposite arrangement may be adopted: with the hammer 22 closer to the axis of rotation than the fork 21.

The fork 21 has a head 210 in the shape of a "V", making it possible to take hold of and centre the thread 4. During the gripping phase, the plane formed by the "V" is arranged substantially perpendicular to the thread 4. When the thread 4 is to be arranged radially, which is the case in FIG. 1, the strip forming the fork 21 is oriented tangentially to a circle concentric with the core 1. The fork 21 also comprises a recess 211, the role of which will become apparent below.

The fork 21 is intended to carry the thread 4 into contact with the core 1, and then hold it there. To this end, its advance towards the core 1 is triggered when the orifice 6 has brought the thread 4 to one end of the to-and-fro movement, that is to say, when the apparatus is substantially in the configuration of FIG. 1. The fork 21 is stopped when it has anchored the thread in the rubber coating the core 1. The fork 21 thus makes it possible to press the thread 4 down with sufficient force for it to adhere correctly at the desired location.

Taking account of the desired laying pitch, itself a function of the rotational movement of the core 1 indicated by the arrow F, the continuation of the movement of the oscillating-arm system 3 causes the formation of a loop about the point 212, which initiates the laying of a new hoop 40 on the core 1 (see FIG. 1). The passage of the orifice 6 beyond the fork 21 in the return phase is permitted by the recess 211, even though the fork 21 is pressed against the core 1 in this phase of the production. It should be pointed out that the size of the loop is a function of the dimension of the point 212.

The hammer 22 intervenes after the fork 21 and after the return phase of the orifice 6. In the examples considered, the hammer 22 presses on the thread 4 at a slightly higher radial position. Preferably, it still holds the thread 4 while the fork 21 is retracted. The thread-holding of the hammer while the fork retracts helps to avoid the situation in which the fork 21 carries along with it the loop of thread 4 which has formed about one of its points 212 and which, even if it is stuck to the rubber, might have a tendency to remain attached to the fork. The anchorage of the thread 4 in the bead is thereby rendered perfectly reliable.

Of course, the movement into the advanced position and the return into the retracted position, both for the fork 21 and for the hammer 22 (see double arrows A/R and R/A in FIG. 1), are controlled in synchronism with the oscillating-arm system $3^{1a}$ by any suitable device (counter driving motion of the shaft 3D by an appropriate mechanical drive, for example a belt or cable drive or by electrical synchronization between a plurality of motors).

The oscillating-arm system $3^{1a}$ causes the orifice $6^{1a}$ to describe a movement in which it passes over the core 1, and even skirts round it. In all the cases shown, the oscillating-arm system 3 causes the orifice 6 to perform a movement in one plane, the "movement plane". It is necessary to take care in the construction of the edges of the orifice 6 so as not to damage the thread 4, since the emerging strand thereof is generally arranged substantially in the movement plane, that is to say, in a plane which is perpendicular to the geometrical axis of rotation $31R^{1a}$.

It is thus by means of the oscillating shaft $3D^{1a}$ that the appropriate movements are imparted to the oscillating-arm system. The oscillating shaft $3D^{1a}$ does not continuously rotate, but oscillates within the limits of an arc, the precise value of which depends on the desired extent for the movement of the orifice $6^{1a}$. The mechanical control device, of the connecting rod-and-crank type or any other suitable arrangement, is easily designed in accordance with specifications depending on the intended application and is driven by a motor $300^{1a}$.

Figure 3:
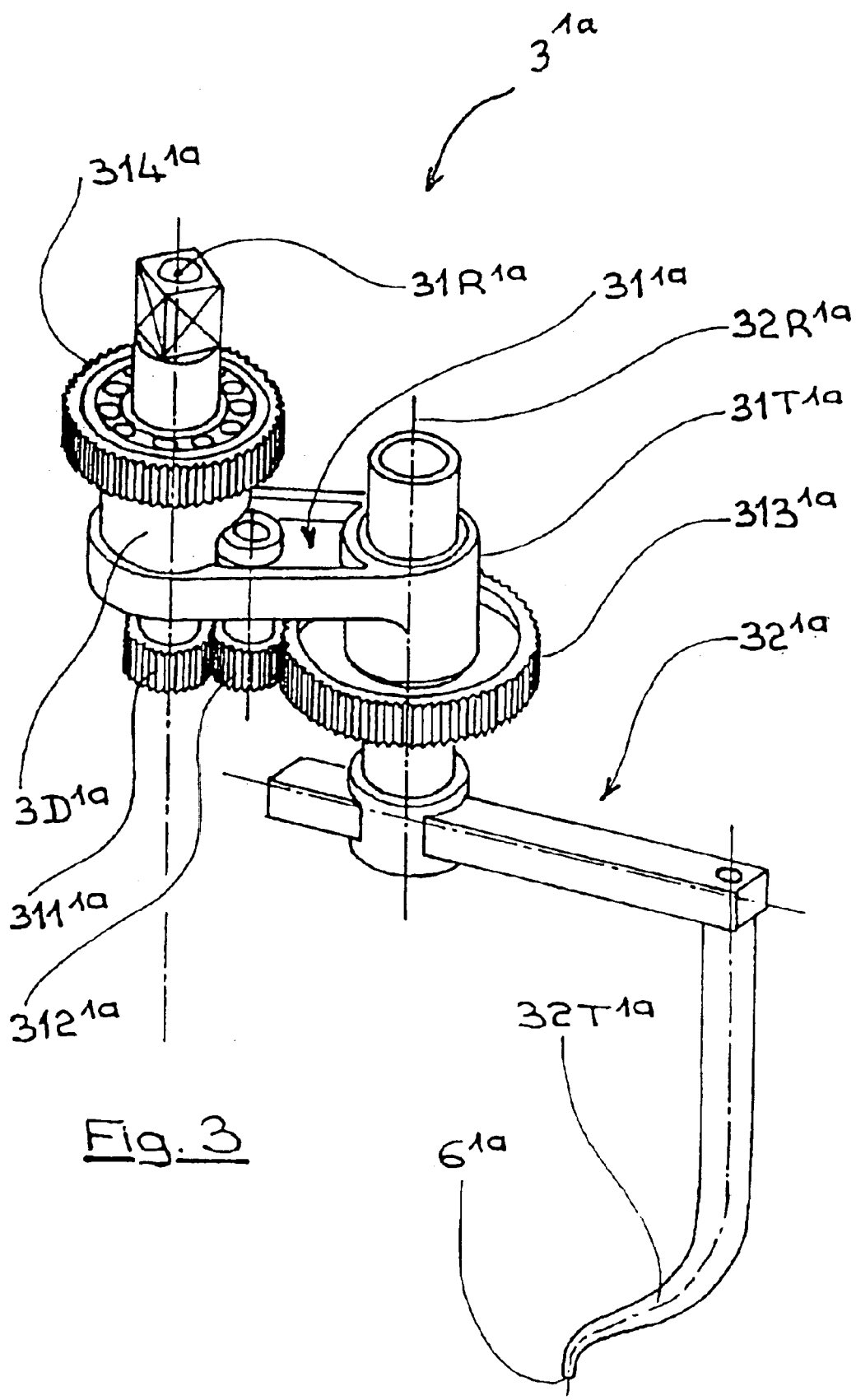
FIG. 3 illustrates a detail of the first version according to the first embodiment.

In order to control the relative position of the second arm $32^{1a}$ with respect to the first arm $31^{1a}$, the first arm supports a succession of pinions (FIG. 3) including a first fixed pinion $311^{1a}$ centered on the geometrical axis of rotation of the first arm, an end pinion $313^{1a}$ centered on the geometrical axis of rotation of the second arm and rotationally fixed relative to the latter, and an intermediate pinion $312^{1a}$ meshing with the first pinion and the end pinion. The first fixed pinion $311^{1a}$ is rotationally fixed relative to the housing $30^{1a}$. The pinions $312^{1a}$ and $313^{1a}$ are rotatably mounted on the first arm $31^{1a}$. The first arm $31^{1a}$ is driven by a driving pinion $314^{1a}$, itself driven in alternating fashion as explained above.

The angle α (FIG. 4) represents the instantaneous position of the first arm $31^{1a}$ The angle α varies over a sufficient extent for the laid thread to reach the end zones of the path. It is advisable for the orifice 6 to go beyond the location at which the presser device 2 intervenes. In the first version illustrated in FIGS. 3 and 4, the extent of the angular movement of the first arm $31^{1a}$ is large enough but the first arm is of short length and thus of low inertia. The number of teeth $N_f$ of the fixed pinion $311^{1a}$ is less than the number of teeth $N_e$ of the end pinion $313^{1a}$, where $N_f$=a $N_e$, the first arm describing oscillations of extent α, α being negative in the trigonometric sense, the second arm describing oscillations of extent β=180°-aα about the said form, β being positive in the trigonometric sense. In one example, a reduction of 12/18 is used. The extent of the angular movement of the second oscillating arm $32^{1a}$ remains compatible with high rates.

Figure 4:
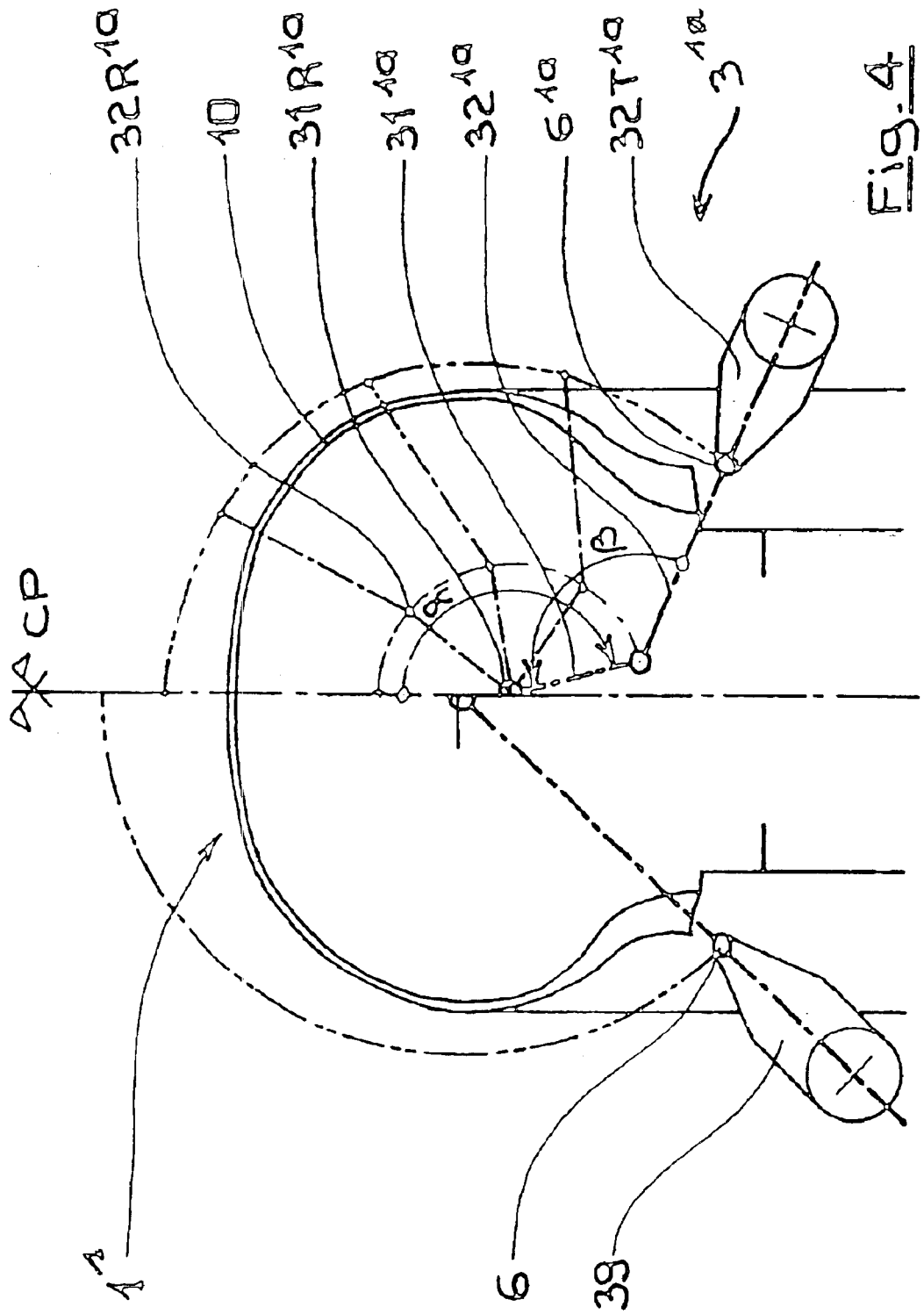
FIG. 4 compares the operation of the first version of the first embodiment with an embodiment with a single arm.

On the left-hand part of FIG. 4, an apparatus with a single arm 39 is shown, whereas on the right-hand part of the same figure, an apparatus according to the first version of the first embodiment is shown. It will be realized that the core $1^1$ is designed to produce fairly narrow tires. Apparatuses designed in both cases to come as near as possible to the end of the path of a thread hoop laid on the core are compared. The orifice 6, in both cases, comes very near to the bead. But in the case of the invention (right-hand part of the figure), the oscillating-arm system requires much less free space around the core, since it does not move as far away from the core when it passes over the zone of the future tread.

Figure 5:
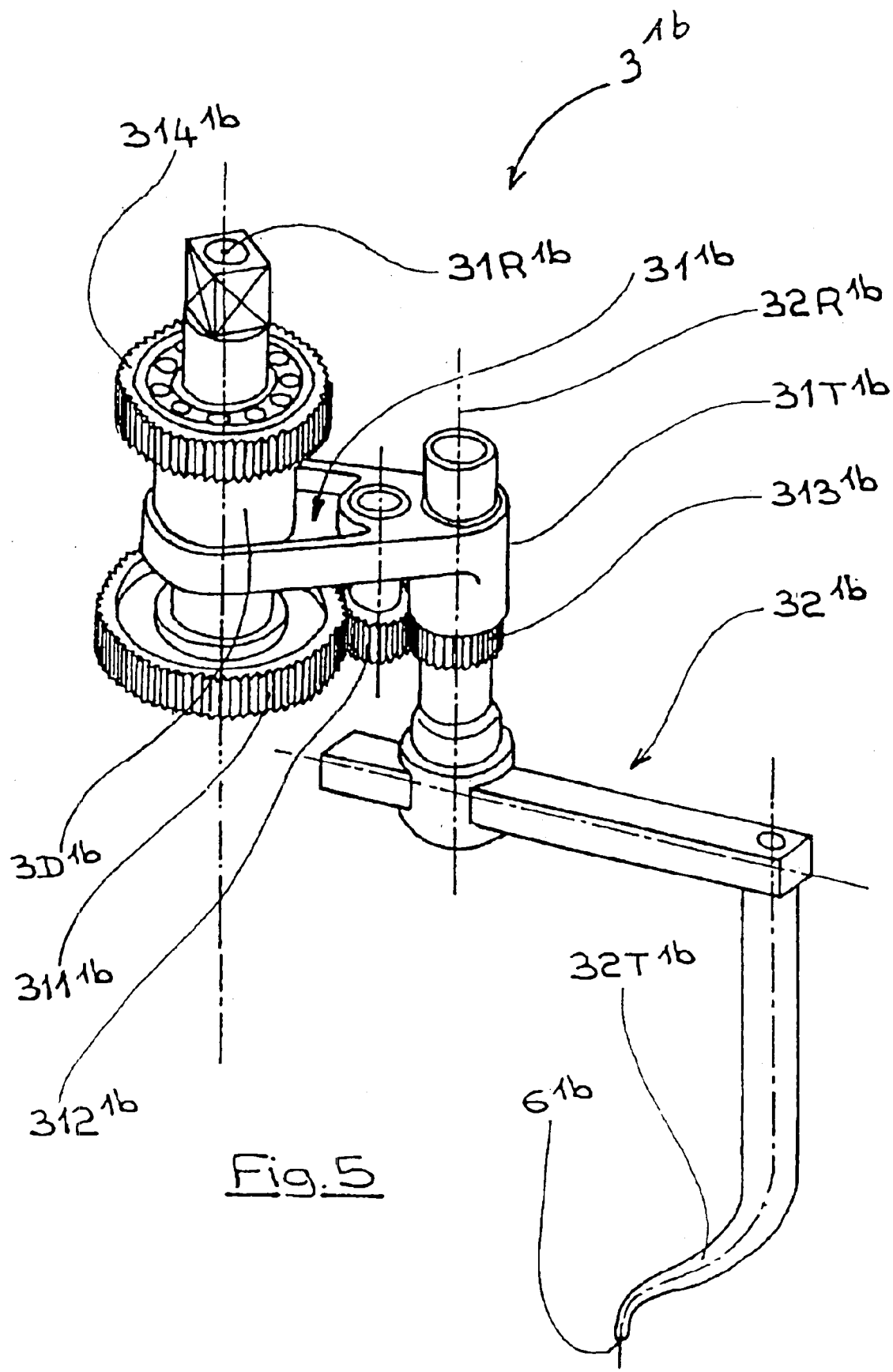
FIG. 5 illustrates a detail of a second version of the first embodiment.
Figure 6:
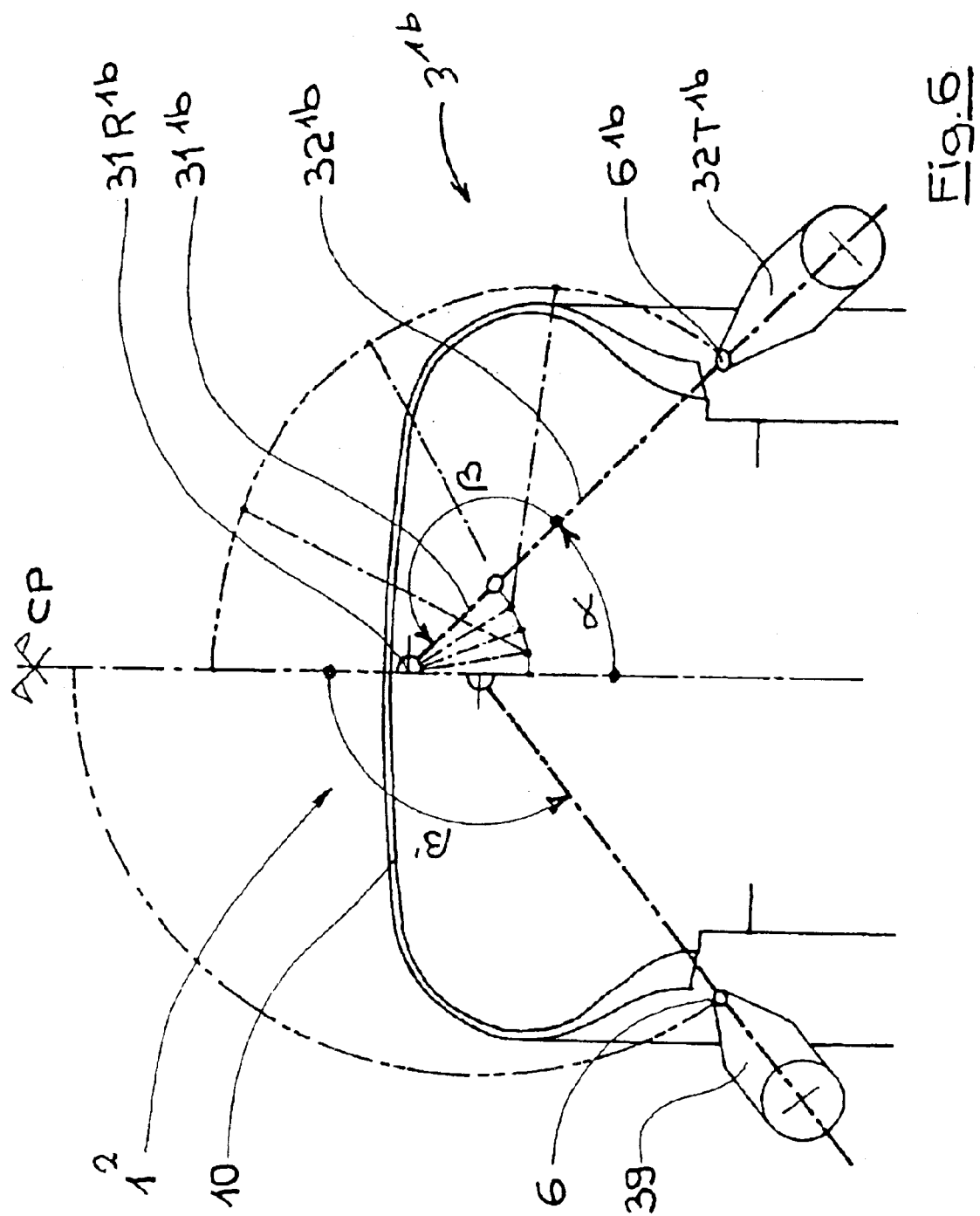
FIG. 6 compares the operation of the second version of the first embodiment with an embodiment with a single arm.

As will be seen in FIGS. 5 and 6 in a variant of the first embodiment, this advantage is even more evident if very wide tires are to be produced, which the core $1^2$ shows well, and which is more and more common for many applications.

It will be noticed that this variant also comprises a first arm $31^{1b}$, an oscillating shaft $3D^{1b}$, a geometrical axis of rotation $31R^{1b}$ of the first arm $31^{1b}$, and a head $31T^{1b}$ at the end opposite the geometrical axis of rotation $31R^{1b}$. It also comprises a second arm $32^{1b}$, having a geometrical axis of rotation $32R^{1b}$, and a head $32T^{1b}$, at the end of which is the orifice $6^{1b}$. A succession of three pinions $311^{1b}$, $312^{1b}$ and $313^{1b}$ are also present (FIG. 5). The first pinion $311^{1b}$ is fixed, and solid with a housing (not shown). The pinions 3121b and $313^{1b}$ are rotatably mounted on the first arm $31^{1b}$. The first arm $31^{1b}$ is driven by a driving pinion $314^{1b}$, itself driven in alternating fashion as explained above.

The number of teeth $N_f$ of the fixed pinion $311^{1b}$ is greater than the number of teeth $N_e$ of the end pinion $313^{1b}$, where $N_f$=a $N_e$, the first arm describing oscillations of extent α in the space on the side of its geometrical axis of rotation opposite the form, the second arm describing oscillations of extent β=aα about the form, α and β being positive in the trigonometric sense. A multiplication of 18/12 is used for example. In view of the very low extent of the angular movement of the first arm $31^{1b}$, the extent of the angular movement of the second oscillating arm $32^{1a}$ remains compatible with high rates.

On the left-hand part of FIG. 6, an apparatus with a single arm 39 is shown, whereas on the right-hand part of the same figure, an apparatus according to the second version of the first embodiment is shown. It will be realized that the core $1^2$ is designed to produce wide tires. In FIG. 6, apparatuses designed in both cases to come as near as possible to the end of the path of a thread hoop laid on the core are again compared. The orifice 6, in both cases, comes very near to the bead. But in the case of the invention (right-hand part of the figure), the oscillating-arm system requires considerably less free space around the core. In a case of this kind, which is very common in practice, the single arm 39, which is directly comparable with regard to the laying of the thread on the blank of the future bead, would move far away from the core when it passes over the zone of the future tread. The system of the invention also exhibits a sizeable reduction in inertia of the parts of the laying system in oscillatory motion. The length is shorter, and thus the inertia of the parts in motion is lower, for the solution according to the invention.

Even if (in the previous examples as in the following examples), the orifice 6 describes a movement with a course which is symmetrical with respect to the median plane, and reaches the vicinity of each of the bead zones defined on the core 1 in a perfectly symmetrical movement, this is not limiting. It is not excluded for the ends of the movement of the orifice not to be at points symmetrical with respect to the median plane, for example in order to produce a tire in which the path of the hoops is not symmetrical. This would be the case for producing a tire in which the diameter at the seat of each of the beads is different.

The orifice 6 describes a to-and-fro movement from one bead to the other, or, more precisely, from a location close to one bead to a location close to the other bead. The basic operating cycle of the apparatuses according to the invention comprises the following steps:

with the thread being held against the form for a sufficient time, displacing the orifice (guiding member) in an orifice movement plane as far as a first end;

applying the thread to the form at the first end and holding it there at least for a sufficient time by means of a presser device;

repeating the first step in the opposite direction as far as a second end;

applying the thread to the form at the second end and holding it there by means of another presser device;

and repeating the basic cycle in this way until the desired number of hoops has been laid onto the surface of the form, on a desired path for the thread 4 on the surface of the form, by displacing the form in synchronism with the movement of the guiding member.

Figure 7:
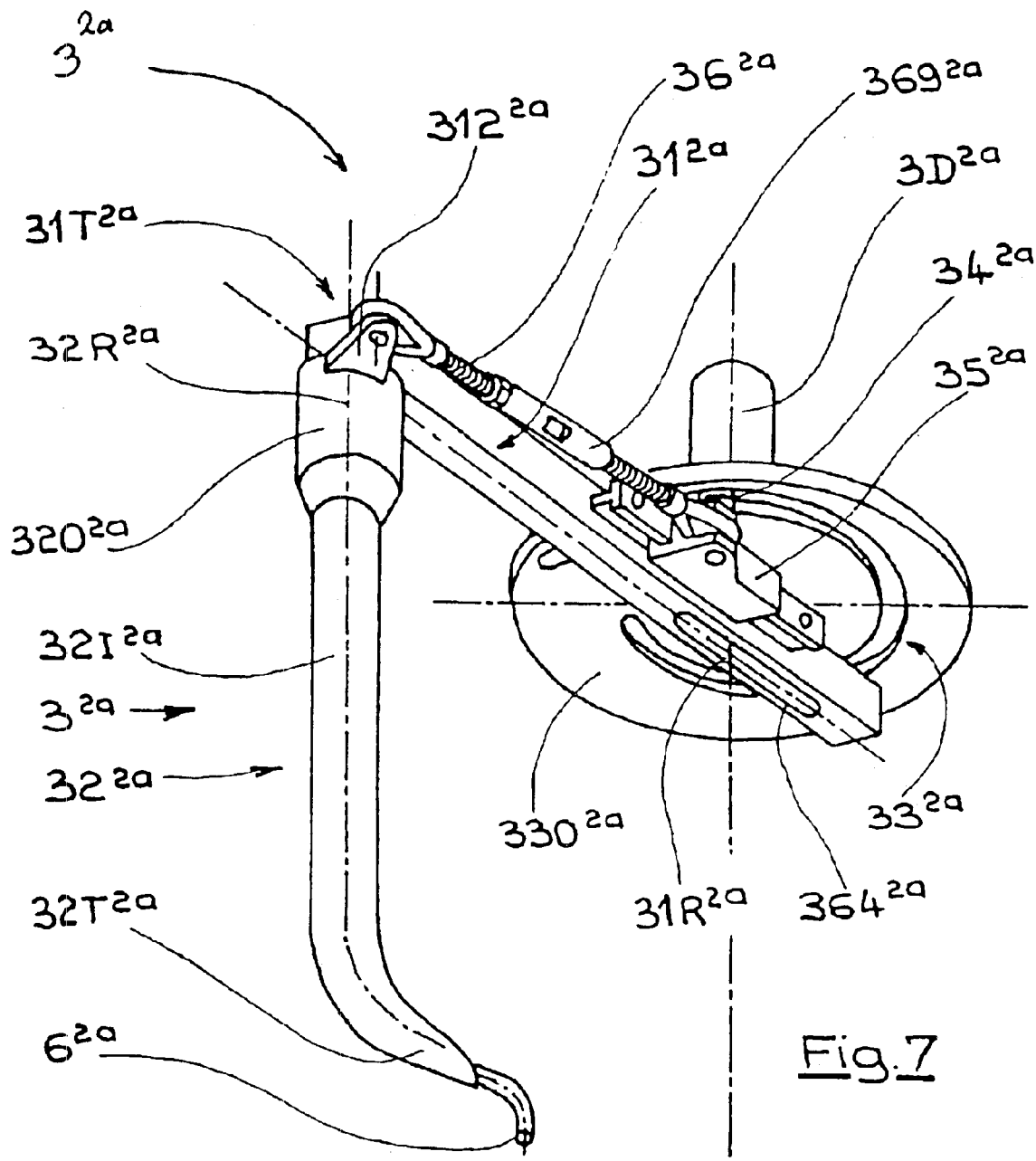
FIG. 7 is a perspective view showing the oscillating arms of a first version of a second embodiment of an apparatus according to the invention.
Figure 8:
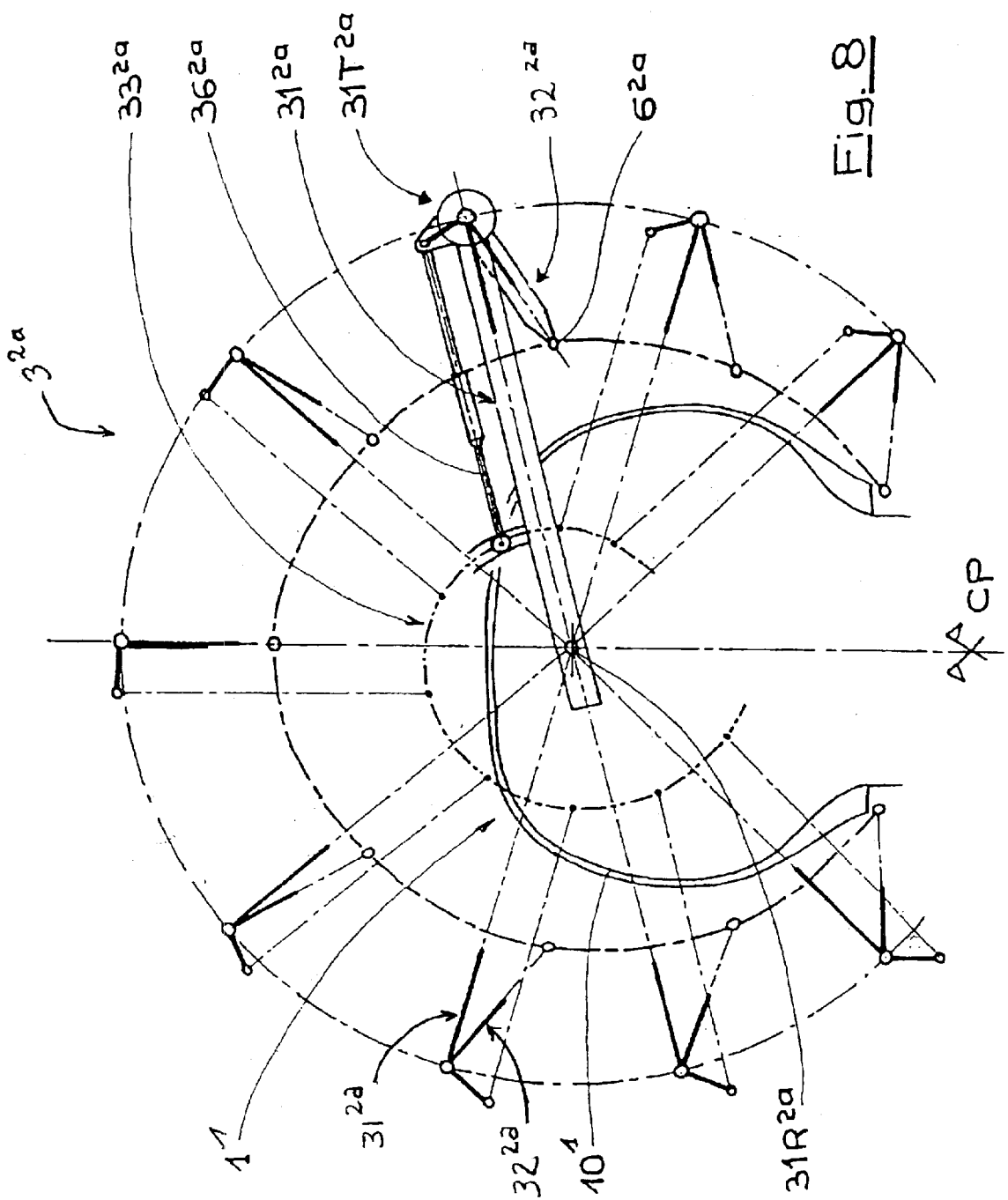
FIG. 8 illustrates the operation of the first version of the second embodiment.
Figure 9:
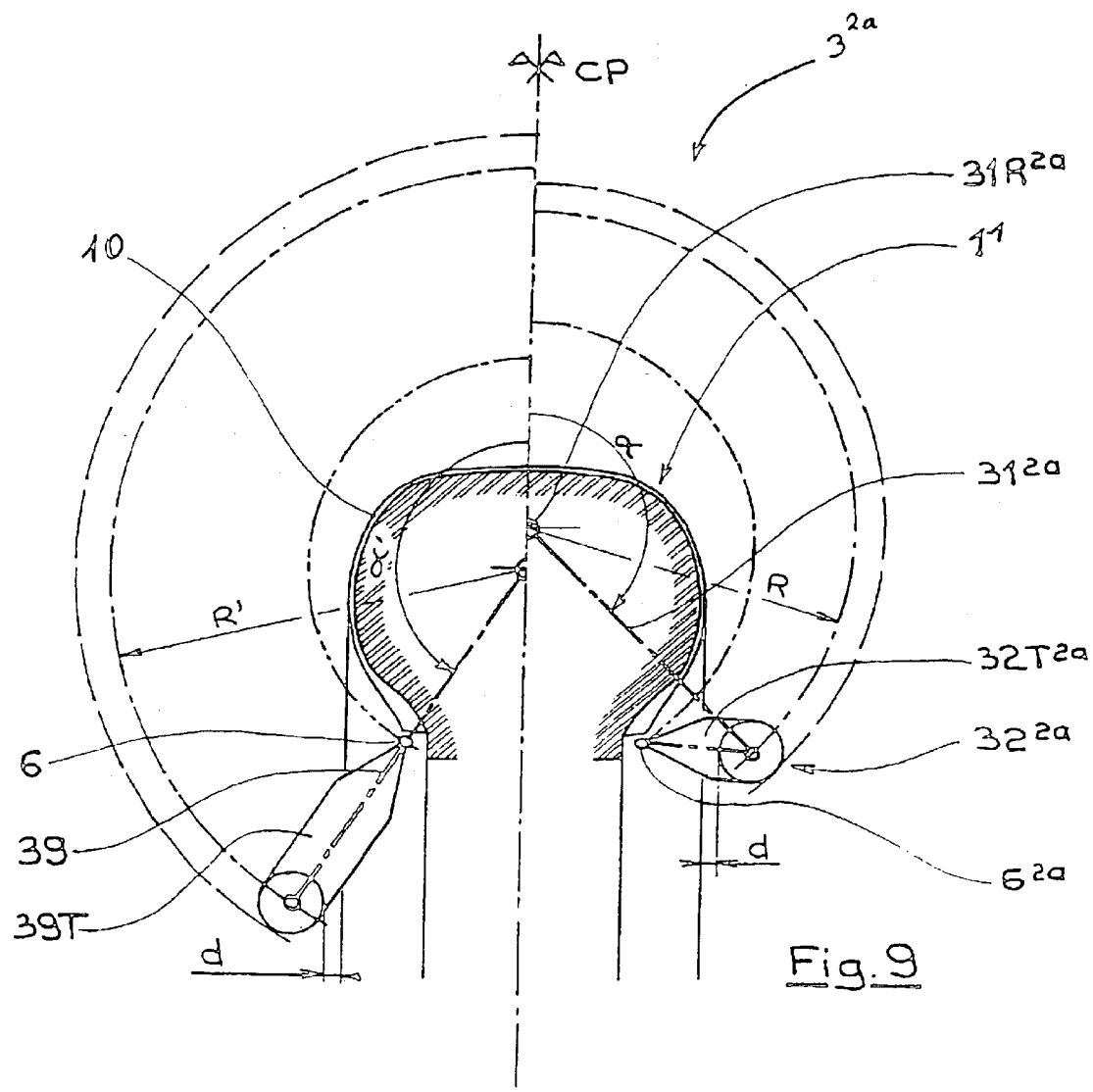
FIG. 9 compares the operation of the first version of the second embodiment with an embodiment with a single oscillating arm.

The first version of a second embodiment of the invention is illustrated in FIGS. 7 to 9. In FIG. 7, only an oscillating-arm system $3^{2a}$ is shown, without depicting the form on which the thread is laid or the housing which supports the system. A first arm $31^{2a}$, mounted on an oscillating shaft $3D^{2a}$ having a geometrical axis of rotation $31R^{2a}$, can be seen. The first arm $31^{2a}$ comprises a head $31T^{2a}$ at the end opposite the geometrical axis of rotation $31R^{2a}$. A second arm $32^{2a}$ is articulated about a geometrical axis of rotation $32R^{2a}$ on the head $31T^{2a}$ of the first arm $31^{2a}$. The apparatus comprises a fixed cam $33^{2a}$ hollowed out of a disc $330^{2a}$ centered on the geometrical axis of rotation of the first arm. A cam follower $34^{2a}$ is in engagement with the cam $33^{2a}$, and controls the movement of a shoe $35^{2a}$, on the first arm $31^{2a}$. The second arm comprises a lever $312^{2a}$ substantially perpendicular to its geometrical axis of rotation $32R^{2a}$, the end of the lever $312^{2a}$ being connected to the shoe $35^{2a}$ by a link $36^{2a}$. This makes it possible to control the relative position of the second arm $32^{2a}$ with respect to the first arm $31^{2a}$, The second arm comprises a base $320^{2a}$ extending substantially parallel to the geometrical axis of rotation $32R^{2a}$, and comprises a head $32T^{2a}$ curved towards the geometrical axis of rotation of the first arm $31^{2a}$. At the end of the head $32T^{2a}$, is an orifice $6^{2a}$. The second arm $32^{2a}$ is designed to carry the orifice $6^{2a}$ as far as the movement plane.

It can be seen in FIG. 8 that, in order to effect movement and configurations of the assembly of the oscillating arms $3^{2a}$ that are symmetrical with respect to the median plane CP, the course of the cam $33^{2a}$ is not symmetrical with respect to the plane CP, since on one side of the plane CP, the second arm $32^{2a}$ has to be swung to one side of the first arm $31^{2a}$, and on the other side of the plane CP, the second arm $32^{2a}$ has to be swung to the other side of the first arm $31^{2a}$.

On the left-hand part of FIG. 9, an apparatus with a single-arm 39 is shown, whereas on the right-hand part of the same figure, an apparatus according to the second embodiment is shown. It will be realized that the core $1^2$ is designed to produce fairly narrow tires. Apparatuses designed in both cases to come as near as possible to the end of the path of a thread hoop laid on the core are compared. The orifice 6, in both cases, comes very near to the bead. It can be seen that the angle $\alpha^1$ necessary for the left-hand apparatus to reach the bead without the intermediate part touching the form, from a median position on the plane CP, is greater than the angle $\alpha$ of the right-hand apparatus according to the invention. Among other advantages, it may be mentioned that the length of the first arm $31^{2a}$ is shorter than that of the arm 39. In addition, the length of the end spout formed by the head $32T^{2a}$ is much shorter than that of the spout 39T. However, the clearance "d" existing between the form and the laying device is directly comparable. The advantages of the invention can thus be seen.

By virtue of the cam control, the relative movement between the second arm and the first arm can be adjusted fairly freely to the requirements, since it depends essentially on the profile of the cam. One is thus freed from the proportionality constraint on the relative rotational movement between the first and the second arms, specific to the pinion control of the first embodiment, or the second version of the second embodiment. It is possible to set a relative position of the second arm with respect to the first arm so as, in particular, to remove the orifice 6 rapidly from the core 1. An appropriate clearance "d" between the head $32T^{2a}$ and the core 1 is thus ensured, while coming sufficiently close to the surface of the core 1 in the bead zone.

Figure 10:
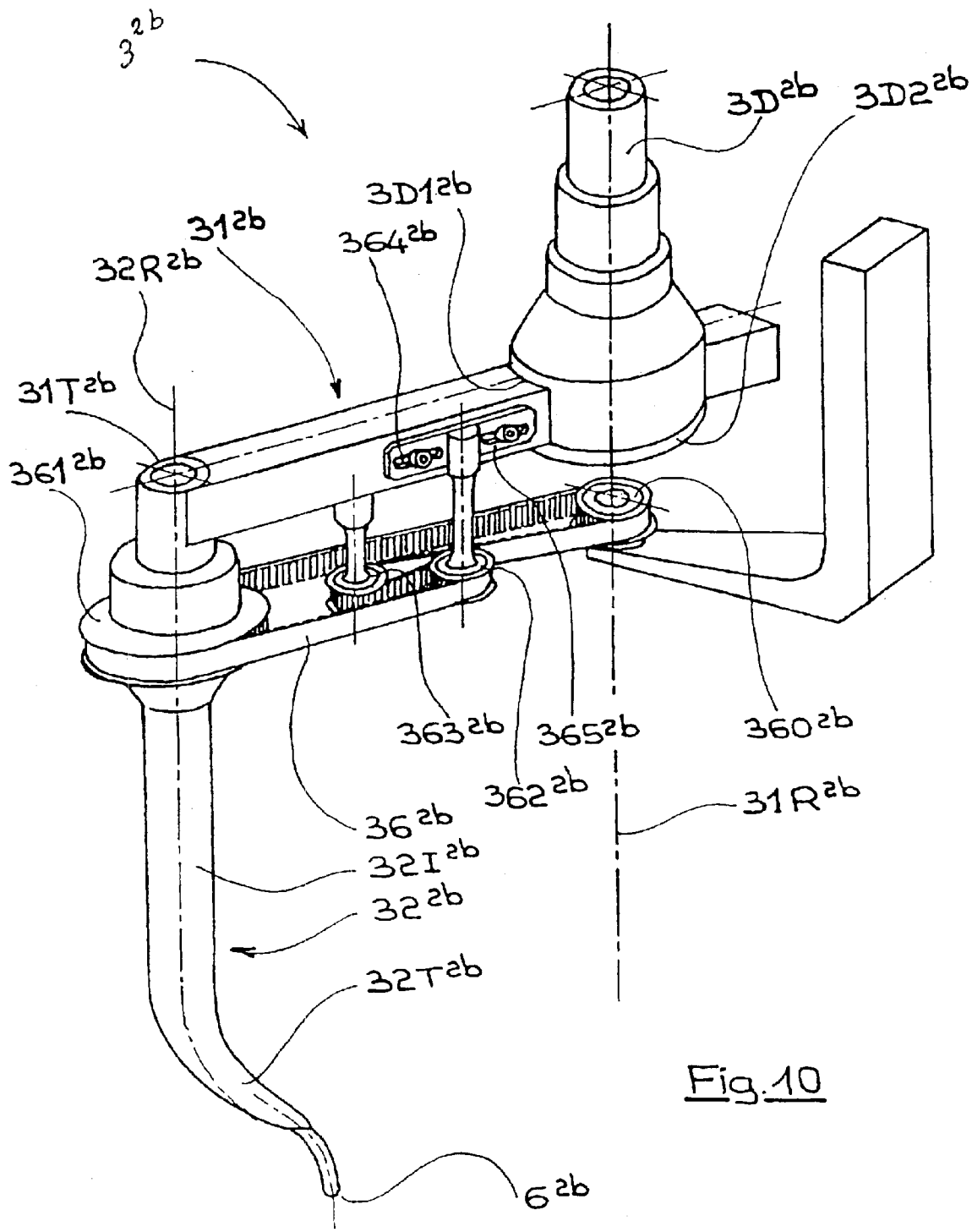
FIG. 10 is a perspective view showing the oscillating arms of a second version of the second embodiment of an apparatus according to the invention.

FIG. 10 illustrates an alternative version of the second embodiment, in which an arrangement with a belt $36^{2b}$ performs a function comparable to the cam of the previous example. An oscillating shaft $3D^{2b}$ supporting a first arm $31^{2b}$ can be seen. The first arm $31^{2b}$ comprises a head $31T^{2b}$. A second arm $32^{2b}$ is rotatably mounted on the head $31T^{2b}$. The notched belt $36^{2b}$ is mounted on a first pulley $360^{2b}$ centered on the geometrical axis of rotation $31R^{2b}$ of the first arm. The first pulley $360^{2b}$ is not rotationally movable. The notched belt $36^{2b}$ is also mounted on a second pulley $361^{2b}$ centered on the geometrical axis of rotation $32R^{2b}$ of the second arm $32^{2b}$. The second pulley $361^{2b}$ is solid with the said second arm.

The belt $36^{2b}$ is also wound around a tension roller $362^{2b}$ and a guide roller $363^{2b}$, both fixed to the first arm $31^{2b}$. The first arm $31^{2b}$ is mounted in a passage $3D1^{2b}$ formed in the shaft $3D^{2b}$, and is immobilized by means of an end plate $3D2^{2b}$. This provides a slide enabling modification of the relative position of the first arm $31^{2b}$ on the shaft $3D^{2b}$, so as to be able to adjust the distance between the geometrical axes of rotation $31R^{2b}$ and $32R^{2b}$. In order to be able to compensate for these variations of distance when the length of the belt $36^{2b}$ is fixed, the tension roller $362^{2b}$ is mounted on the first arm $31^{2b}$ by means of a bracket $365^{2b}$ comprising adjusting slots $364^{2b}$.

Of course, it may be advantageous to provide for such an adjustment in other embodiments. For example, in FIG. 7 there can be seen a slot $364^{2a}$ formed in the first arm $31^{2a}$, so as to be able to adjust the relative position thereof with respect to the shaft $3D^{2a}$ during assembly. The existence of a possibility of adjustment is the reason for which the link $36^{2a}$ comprises an adjusting sleeve $369^{2a}$.

Figure 11:
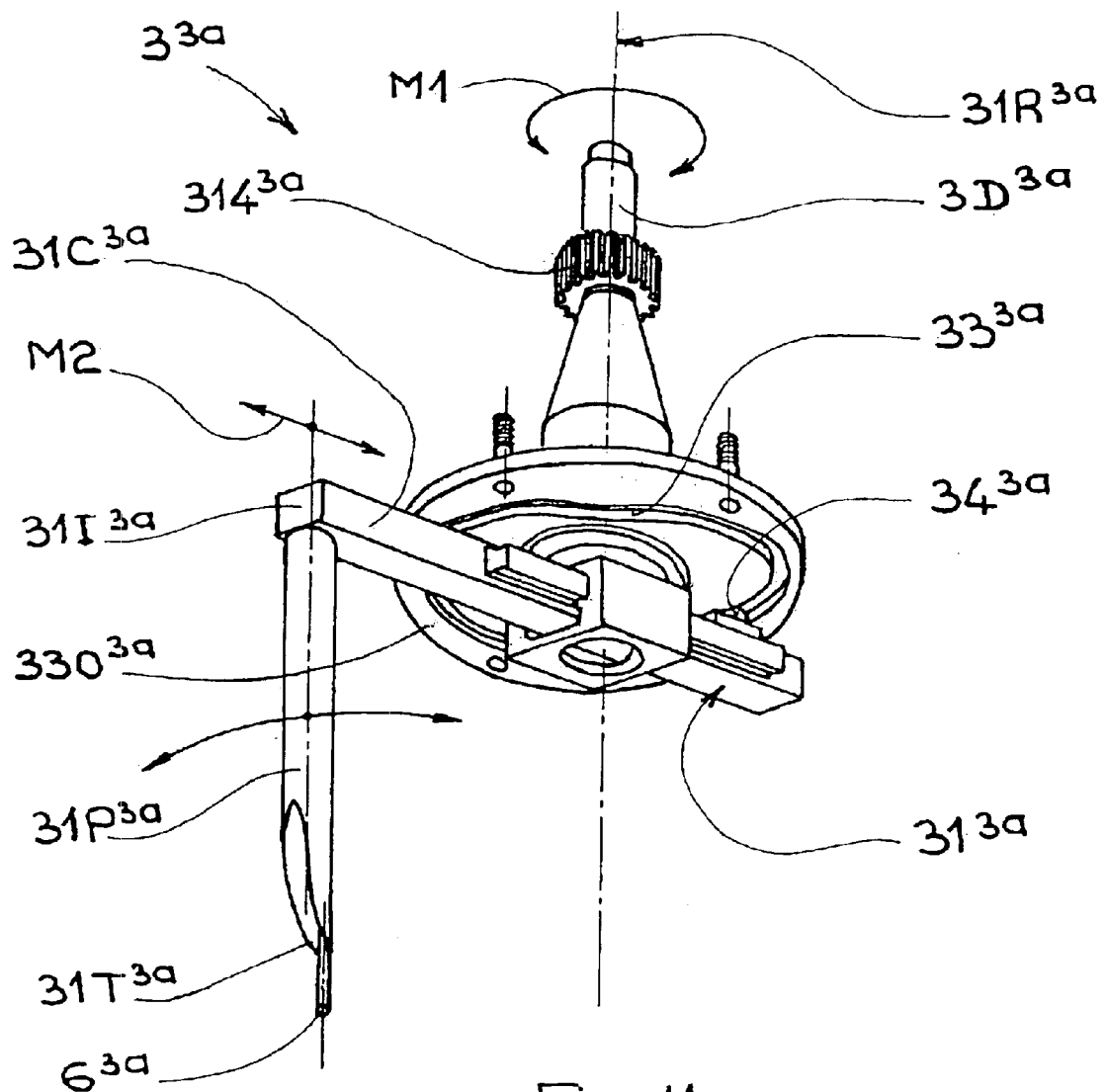
FIG. 11 is a perspective view showing a third embodiment of an apparatus according to the invention.
Figure 12:
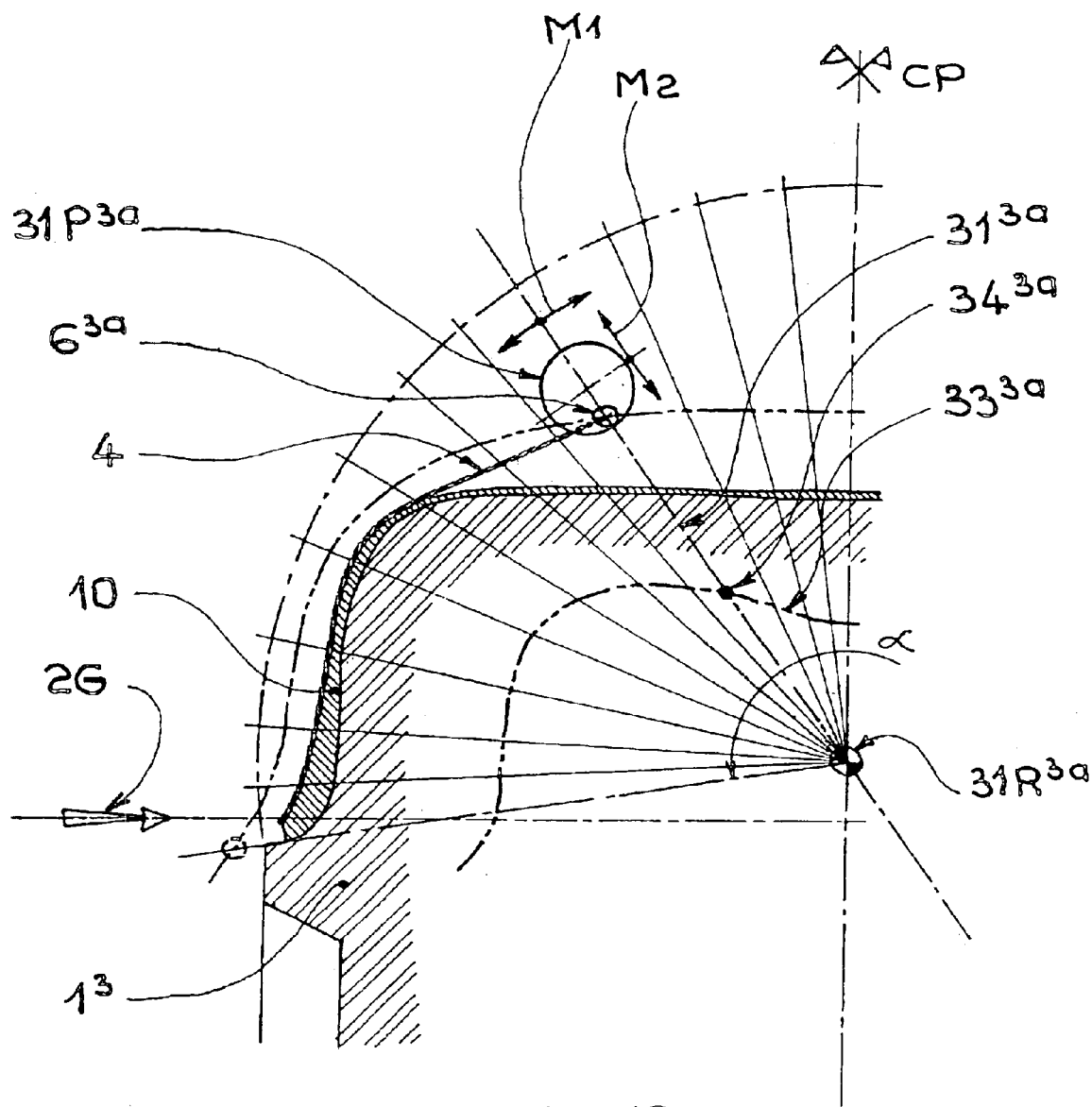
FIG. 12 illustrates the operation of the third embodiment.

In FIGS. 11 and 12, an embodiment adapted to the production of tires for the PAX system can be seen. The core $1^3$ (FIG. 12) has a characteristic form in the bead zone. In FIG. 11, only an oscillating-arm system $3^{3a}$ is shown, without depicting the form on which the thread is laid or the housing which supports the system. An arm $31^{3a}$, mounted on an oscillating shaft $3D^{3a}$ having a geometrical axis of rotation $31R^{3a}$, can be seen. The arm $31^{3a}$ comprises a central portion $31C^{3a}$ intersecting the geometrical axis of rotation $31R^{3a}$ and substantially perpendicular thereto. The apparatus comprises a fixed cam $33^{3a}$ hollowed out of a disc $330^{3a}$ centered on the geometrical axis of rotation of the arm $31^{3a}$. A cam follower $34^{3a}$ is in engagement with the cam and is rotationally fixed relative to the central portion $31C^{3a}$. The central portion $31C^{3a}$ slides radially with respect to the oscillating shaft $3D^{3a}$, and thus with respect to the geometrical axis of rotation $31R^{3a}$. The translational movement (see the double arrow M2) of the arm $31^{3a}$ is controlled by the cam follower $34^{3a}$.

The oscillating shaft $3D^{3a}$ is solid with a driving pinion $314^{3a}$, itself driven in alternating fashion as explained above (see explanations for the driving pinion $314^{1b}$ of FIG. 5) so as to impart the rotational movement M1. The angle α (FIG. 12) shows the instantaneous position of the arm $31^{3a}$. The angle α varies over a sufficient extent for the laid thread to reach the end zones of the path. It is advisable that the orifice 6 to go beyond the location at which the presser device 2 intervenes.

The central portion $31C^{3a}$ joins an end portion $31T^{3a}$ extending substantially parallel to the geometrical axis of rotation $31R^{3a}$ and supporting the guiding member (orifice) $6^{3a}$. In the embodiment illustrated, the arm $31^{3a}$ forms a right angle $31I^{3a}$ between the central portion $31C^{3a}$ and the end portion $31T^{3a}$. At the end of the end portion $31\ T^{3a}$ is the orifice $6^{3a}$.

In order to effect a symmetrical movement with respect to the median plane CP, the course of the cam $33^{3a}$ is symmetrical with respect to the plane CP. A person skilled in the art will adapt the course of the cam to the case of an asymmetrical tire.

Among the advantages of the foregoing embodiment, it may be mentioned that the movement of the first arm $31^{3a}$ can be adjusted fairly freely to the requirements since it depends essentially on the profile of the cam. It is possible to come sufficiently close to the surface of the core 1 in the bead zone without moving far away from the surface of the core in the region of the plane CP.

The previous examples illustrate apparatuses in which the geometrical axis of rotation of the at least one arm intersects the form in the working position, the arm(s) being formed and arranged so that the guiding member 6 skirts around the form without moving too far away from it. The relative movement between guiding member and the form determines the desired path for the thread on the surface of the form.

The previous examples illustrate apparatuses laying lengths of threads from one bead to the other bead. It is also possible to construct or use apparatuses acting from one bead to a shoulder, for example for the production of a half-carcass. Indeed, it is known that the carcass of a radial tire may not be continuous from one bead to the other, but may be interrupted somewhere beneath the tread. The carcass reinforcement is in this case laid between the bead and a shoulder. An apparatus according to the invention could equally well be used for acting from a bead as far as any point beneath the tread, including as far as the opposite shoulder, with a certain degree of mutual overlapping of the half-carcasses.

It will be recalled that the orifice 6, in all the versions, is moved cyclically in one plane, called the "orifice movement plane" above. The core 1 is rotationally driven about its axis while the orifice 6 performs its to-and-fro movements in the orifice movement plane. Of course, the movement of the core 1 is in synchronism with the to-and-fro movement of the orifice. The actual path of the hoops 40 of the thread 4 is thus both a function of the relative fixed position (which may be inclined) between the orifice movement plane and the core and a function of the relative movement between the core 1 and the to-and-fro movement of the orifice 6.

In the examples described, the path of the hoop 40 is substantially radial because the construction of a carcass for a radial tire is described therein, although this is, of course, not limiting. The movement plane could also form any angle, for example of the order of 20°, with respect to a plane perpendicular to the axis of rotation of the core 1, in accordance with the customary conventions for measuring angles in the field of tires. The presser devices $2^G$ and $2^D$ act in the same laying plane.

In order to construct a carcass with a crosswise arrangement in the sidewalls, it is possible to move the orifice movement plane away from a purely radial orientation by inclining the support of the laying members (such as the housing 30) about an axis parallel to the axis of rotation of the core 1. It is also possible, without any changes to the members of the apparatus as described, to change the azimuth of the core by a sizeable angle, for example ⅛ of a revolution for one to-and-fro movement of the arm system 3, so as to obtain a thread laying angle which is a function of the ratio of the displacements (whereas in all the previous examples the speed of the core 1 acted only on the single laying pitch).

The following remark explains a further variant, which may be applied to all the embodiments described here, in all their versions. The support of the laying members (such as the housing $30^{1a}$—see FIG. 1) may be moved in reciprocating fashion in order to inflect the laying path of the thread 4 on the core 1. For example, the support of the laying members may be moved in a reciprocating translatory fashion (see double arrow P in FIG. 1) to enable the translation of the orifice movement plane in a direction perpendicular to the movement plane. The support of the laying members may also be moved in an oscillatory fashion about a geometrical axis perpendicular to the surface of the form, contained in the movement plane and intersecting the geometrical axis of rotation of the first arm (see double arrow Q about the axis M—M in FIG. 1), enabling the oscillation of the movement plane about an axis parallel to the movement plane. The support of the laying members may also be moved in an oscillatory fashion about any axis parallel to the aforementioned plane. It is necessary to distinguish such a concept from a simple fixed adjustment (also possible and useful in certain cases) of the angle which the housing $30^{1a}$ forms about the axis MM. All these particular embodiments give an additional degree of freedom for acting on the exact form of the path of the thread 4.

It should also be pointed out that, in the case of the construction of half-carcasses, each of the half-carcasses may be constructed simultaneously on either side of the core by providing two facing apparatuses according to the invention, on one each side of the core, the ends of the path in this case being in the zone of a bead, on the one hand, and in the zone of a shoulder (any shoulder), on the other hand. Alternatively, each of the half-carcasses may be constructed successively. Crown reinforcements may also be constructed, the ends of the paths in this case both being somewhere beneath the tread, for example in each of the shoulders.

The laying members as a whole, namely the oscillating-arm system 3 and the presser devices 2, including the motor and the drive mechanism, form a subassembly which can easily be brought up to the core in an appropriate manner, and can be withdrawn in order, for example, to bring up to the core other devices used for the production of a tire or for taking the core away to other stations for making a tire.

The invention enables the production of a tire by a method in which a reinforcement is produced from a thread, delivered continuously and on request by an appropriate dispenser, by using a substantially toroidal form on which the reinforcement is progressively constructed by laying hoops of the thread on a desired path for the thread on the surface of the form, by means of any one of the apparatuses described for applying lengths of thread from one of the beads of the tire to the other bead. In particular, as illustrated, the method enables the production of the reinforcement by laying the hoops of the thread side by side on the surface of the form.

What is claimed is:

1. Apparatus for producing a tire reinforcement from a thread delivered substantially continuously and on request by an appropriate dispenser, the apparatus being intended to be used in cooperation with a substantially toroidal form on which the reinforcement is progressively constructed by laying hoops of the thread between spaced ends of a desired path for the thread on the surface of the form, the apparatus comprising:

a guiding member in which the thread can slide freely;
an oscillating-arm system having
(a) at least a first arm oscillating about a first geometrical axis of rotation and oriented substantially perpendicular thereto, the oscillating first arm comprising a head remote from the first geometrical axis of rotation, the head of the oscillating arm transporting said guiding member directly, or indirectly via one or more other arms, to guide the thread along the desired path by causing said guiding member to pass over, but without substantially contacting, the form, with movement of said guiding member being substantially contained in a movement plane that is substantially perpendicular to said first geometrical axis of rotation; and
(b) means for varying a radial distance, in said movement plane, between said guiding member and said first geometrical axis of rotation during said movement of said guiding member;

control means for imparting to the oscillating first arm an oscillatory movement about the first geometrical axis of rotation; and pressure means adjacent each of the ends of the path for applying the thread to the form at the respective ends of the path.

2. Apparatus according to claim 1, wherein said oscillating arm system comprises:

a second arm oscillating about a second geometrical axis of rotation, the first and second geometrical axes of rotation being substantially parallel;
the second arm comprising a head transporting the guiding member directly, or indirectly via one or more other arms; and
the head of the first arm supporting the second arm for rotation about the second geometrical axis of rotation.

3. Apparatus according to claim 2, in which the head of the second arm is radially remote from the second geometrical axis of rotation.

4. Apparatus according to claim 2, further comprising means for controlling the relative position of the second arm with respect to the first arm so that the guiding member is transported in a cyclical movement in order to bring the guiding member in successive cycles into the vicinity of each of the desired ends for the thread in the path.

5. Apparatus according to claim 2, in which the head of the second arm is curved towards the substantially toroidal form on which the reinforcement is to be constructed, and directly supports the guiding member, so as to bring the guiding member close to the form at least in the configuration assumed by the apparatus when the guiding member is close to the end of the desired path.

6. Apparatus according to claim 2, in which the second arm has at least one intermediate part oriented substantially parallel to the first geometrical axis of rotation.

7. Apparatus according to claim 2, in which the second arm includes a base which includes the second geometrical axis of rotation and which is oriented substantially perpendicular to the second geometrical axis of rotation.

8. Apparatus according to claim 7, in which the first arm supports a succession of pinions including a first fixed pinion centered on the first geometrical axis of rotation, an end pinion centered on the second geometrical axis of rotation and rotationally fixed relative to the second arm, and an intermediate pinion meshing with the first pinion and the end pinion.

9. Apparatus according to claim 8, in which the number of teeth $N_f$ of the fixed pinion is less than the number of teeth $N_e$ of the end pinion, where $N_f = a\, N_e$, the first arm describing oscillations of extent $\alpha$, $\alpha$ being negative in the trigonometric sense, and the second arm describing oscillations of extent $\beta = 180° - a\alpha$ about the said form, $\beta$ being positive in the trigonometric sense.

10. Apparatus according to claim 8, in which the number of teeth $N_f$ of the fixed pinion is greater than the number of teeth $N_e$ of the end pinion, where $N_f = a\, N_e$, the first arm describing oscillations of extent $\alpha$ in the space on the side of the first geometrical axis of rotation opposite the form, and the second arm describing oscillations of extent $\beta = a\alpha$ about the form, $\alpha$ being negative in the trigonometric sense, $\beta$ being positive in the trigonometric sense.

11. Apparatus according to claim 7, in which the first arm supports a notched belt mounted on a first pulley, centered on the first geometrical axis of rotation and rotationally fixed relative thereto, and on a second pulley, centered on the second geometrical axis of rotation and rotationally fixed relative to the second arm.

12. Apparatus according to claim 2, further comprising a fixed cam centered on the first geometrical axis of rotation, a cam follower supported on the first arm in engagement with the cam, the first arm comprising a shoe, the movement of which is controlled by the cam follower, the second arm comprising a lever substantially perpendicular to the second geometrical axis of rotation, the end of said lever being connected to the shoe by a link.

13. Apparatus according to claim 2, in which the head of the second oscillating arm directly transports the guiding member.

14. Apparatus according to claim 2, in which the at least one arm comprises a central portion intersecting the first geometrical axis of rotation in substantially perpendicular relation thereto, the central portion joining an end portion of the arm substantially parallel to the second geometrical axis of rotation and supporting the guiding member, said central portion being translatable radially with respect to the first geometrical axis of rotation.

15. Apparatus according to claim 14, comprising:

a fixed cam; and a cam follower in engagement with the fixed cam and rotationally fixed relative to the central portion of the arm, the translational movement of the central portion being controlled by the cam follower.

16. Apparatus according to claim 1, in which the first geometrical axis of rotation intersects the form on which the reinforcement is to be constructed in the working position, the at least one arm being formed and arranged so that the guiding member skirts around the form, the relative movement between guiding member and the form determining the desired path for the thread on the surface of the form.

17. Apparatus according to claim 2, in which the guiding member comprises an orifice at the end of the second oscillating arm to dispense the thread onto the surface of the form, the second arm being hollow and having the thread passing therethrough.

18. Apparatus according to claim 1, in which the means for controlling the oscillating arm transports the guiding member in a cyclical movement described in one movement plane, so as to bring the guiding member in successive cycles into the vicinity of each of the desired ends for the thread in the thread path.

19. Apparatus according to claim 1, wherein said guiding member comprises an orifice adapted to dispense the thread onto the surface of the form, wherein said guiding member the movement of which is substantially contained in the movement plane includes said orifice.

20. Apparatus according to claim 1, wherein substantially all of said guiding member is contained in said movement plane.

21. A method for producing a tire, in which a reinforcement is produced from a thread delivered substantially continuously and on request by an appropriate dispenser, using a substantially toroidal form on which the reinforcement is progressively constructed by laying hoops of the thread between spaced ends of a desired path for the thread on the surface of the form, by means of a guiding member in which the thread can slide freely;

an oscillating-arm system having (a) at least a first arm oscillating about a first geometrical axis of rotation and oriented substantially perpendicular thereto, the oscillating first arm comprising a head remote from the first geometrical axis of rotation, the head of the oscillating arm transporting said guiding member directly, or indirectly via one or more other arms, to guide the thread along the desired path by causing said guiding member to pass over, but without substantially contacting, the form, with movement of said guiding member being substantially contained in a movement plane that is substantially perpendicular to said first geometrical axis of rotation; and (b) means for varying a radial distance, in said movement plane, between said guiding member and said first geometrical axis of rotation during said movement of said guiding member;

control means for imparting to the first arm an oscillatory movement about said first geometrical axis of rotation, the apparatus being arranged so that the head of the oscillating arm transports the guiding member directly, or indirectly via one or more other arms;

pressers close to the respective ends of the path for applying the thread to the form at the ends;

the guiding member having a cyclical movement included in said movement plane, in order to bring the guiding member in successive cycles into the vicinity of each of the spaced ends for the thread in the path; and the pressers acting in synchronism with the cyclical movement of the guiding member to apply lengths of thread from one of the beads of the tire to the other bead.

22. A method for producing a tire according to claim 21, in which the reinforcement is produced by laying hoops of the thread side by side on the surface of the form.

23. Method according to claim 21, wherein substantially all of said guiding member is contained in said movement plane.

* * * * *